"" US011952281B2

United States Patent
Yuge

(10) Patent No.: US 11,952,281 B2
(45) Date of Patent: Apr. 9, 2024

(54) HYDROPHILIC CARBON NANOHORN AGGREGATE AND METHOD FOR PRODUCING THE SAME

(71) Applicant: NEC Corporation, Tokyo (JP)

(72) Inventor: Ryota Yuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/859,129

(22) Filed: Jul. 7, 2022

(65) Prior Publication Data

US 2023/0036037 A1 Feb. 2, 2023

(30) Foreign Application Priority Data

Jul. 27, 2021 (JP) .................. 2021-122084

(51) Int. Cl.
*C01B 32/18* (2017.01)
*H01B 1/04* (2006.01)

(52) U.S. Cl.
CPC ............... *C01B 32/18* (2017.08); *H01B 1/04* (2013.01); *C01P 2002/88* (2013.01); *C01P 2004/50* (2013.01)

(58) Field of Classification Search
CPC ............................. C01P 2004/50; C01B 32/18
See application file for complete search history.

(56) References Cited

U.S. PATENT DOCUMENTS

2008/0152593 A1* 6/2008 Iijima ................. A61K 49/189
424/9.3
2018/0105425 A1* 4/2018 Yuge .................... H01M 4/625

FOREIGN PATENT DOCUMENTS

JP 2009-190928 A 8/2009
WO 2016/147909 A1 9/2016

OTHER PUBLICATIONS

M. Zhang et al., "Light-Assisted Oxidation of Single-Wall Carbon Nanohorns for Abundant Creation of Oxygenated Groups That Enable Chemical Modifications with Proteins to Enhance Biocompatibility", ACS Nano, 2007, vol. 1, No. 4, pp. 265-272.
H. Hanayama et al., "Cyclodextrins as Surfactants for Solubilization and Purification of Carbon Nanohorn Aggregates", Chemistry an Asian Journal 2020, 15, pp. 1549-1552.

* cited by examiner

*Primary Examiner* — Khanh T Nguyen
(74) *Attorney, Agent, or Firm* — Sughrue Mion, PLLC

(57) ABSTRACT

Disclosed is a hydrophilic carbon nanohorn aggregate comprising a carbon nanohorn aggregate having an oxygen-containing functional group introduced at a tip of a carbon nanohorn, and a cyclodextrin which is capping the tip of the carbon nanohorn and being stabilized.

13 Claims, 5 Drawing Sheets

HYDROPHILIC CARBON NANOHORN AGGREGATE AND METHOD FOR PRODUCING THE SAME

This application is based upon and claims the benefit of priority from Japanese patent application No. 2021-122084, filed on Jul. 27, 2021, the disclosure of which is incorporated herein in its entirety by reference.

TECHNICAL FIELD

The present invention relates to a hydrophilic carbon nanohorn aggregate that can be dispersed in water, a hydrophilic carbon nanohorn aggregate dispersion liquid containing the hydrophilic carbon nanohorn aggregate, and a method for producing the hydrophilic carbon nanohorn aggregate.

BACKGROUND ART

In recent years, it has been found that nanocarbon materials having a nanoscale size have various properties including excellent conductivity. Carbon nanotubes, graphene, carbon nanohorn aggregates and the like have been discovered and studied. The carbon nanohorn aggregates have been known to have a spherical structure (for example, see Patent Literature 1), but in recent years, those having a fibrous structure (for example, see Patent Literature 2) have also been found, and are expected to be applied in a wide range of fields, such as for improving the response speed of sensors and actuators, improving the output of storage batteries and capacitors, and improving the conductivity of rubber and plastic composite materials.

Since the carbon nanohorn aggregate when produced is a hydrophobic structure material having no hydrophilic group, an attempt to modify the carbon nanohorn aggregate to give hydrophilicity is known. For example, Non-Patent Literature 1 discloses that the tip and side surfaces of carbon nanohorns are oxidized with hydrogen peroxide, oxygen, and the like to oxidize the tips and side surfaces of carbon nanohorns, and carboxyl groups and carbonyl groups are added to the tip portion and the side portion, thereby improving the dispersibility in water.

Further, Non-Patent Literature 2 discloses that when cyclodextrin is added, cyclodextrin binds to the tip of the nanohorn and acts as a surfactant, so that the carbon nanohorn aggregate can be dispersed in water.

CITATION LIST

Patent Literature

Patent Literature 1: Japanese Patent Laid-Open No. 2009-190928
Patent Literature 2: WO 2016/147909

Non-Patent Literature

Non-Patent Literature 1: M. Zhang et al. ACS Nano, 1, 2007, 265
Non-Patent Literature 2: H. Hanayama et al. Chem Asian J. 2020, 15, 1549

SUMMARY OF INVENTION

Technical Problem

However, in the method described in Non-Patent Literature 1, oxidation forms an opening at a tip portion and/or a defective portion of the nanohorn, which enables various substances to be taken into the inside of the carbon nanohorn aggregate. Therefore, there is a problem that it becomes difficult to perform a chemical modification reaction for functionalization or to use as a catalyst support. Further, in the method described in Non-Patent Literature 2, since the carbon nanohorn aggregate is completely water repellent, it is difficult to be capped, and the yield of the dispersion obtained within about 40 hours is about 27 wt %, which means that there is a problem of inefficiency in capping carbon nanohorn aggregate. In addition, the cap gradually comes off, which poses a problem with long-term stability. When the dispersibility in the aqueous solution is poor as described above, there is also a problem that it becomes difficult to remove graphite as an impurity contained in the production of the carbon nanohorn aggregate.

An object of the present invention is to provide a hydrophilic carbon nanohorn aggregate that exhibits excellent dispersibility over a long period of time in an aqueous dispersion medium.

Solution to Problem

One embodiment of the present invention relates to a hydrophilic carbon nanohorn aggregate comprising: a carbon nanohorn aggregate having an oxygen-containing functional group introduced at a tip of a carbon nanohorn, and a cyclodextrin which is capping the tip of the carbon nanohorn and being stabilized Another embodiment of the present invention relates to a method for producing a hydrophilic carbon nanohorn aggregate comprising: oxidation treatment step to oxidize a carbon nanohorn aggregate, and cyclodextrin treatment step to contact cyclodextrin with the oxidized carbon nanohorn.

Advantageous Effect of Invention

According to one embodiment of the present invention, it is possible to provide a hydrophilic carbon nanohorn aggregate that exhibits excellent dispersibility over a long period of time in an aqueous solution.

DESCRIPTION OF EMBODIMENTS

Hereinafter, a hydrophilic carbon nanohorn aggregate according to an embodiment of the present invention will be described.

<Hydrophilic Carbon Nanohorn Aggregate>

The hydrophilic carbon nanohorn aggregate of the present embodiment is obtained by subjecting the carbon nanohorn aggregate to a weak oxidation treatment as described later, and then performing a cyclodextrin treatment in an aqueous solution.

Figure 1:
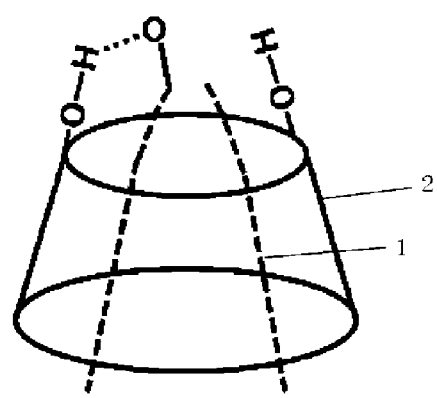
FIG. 1 is a diagram schematically showing a structure of a carbon nanohorn tip (hereinafter, it is also simply referred to as a nanohorn tip).

FIG. 1 schematically shows the structure of a carbon nanohorn tip (hereinafter, also simply referred to as nanohorn tip). It is also shown in Non-Patent Literature 2 that a tip of a nanohorn is capped with cyclodextrin by treating the carbon nanohorn aggregate with cyclodextrin. As shown in FIG. 1, it is considered that the tip portion 1 of the carbon nanohorn is capped with cyclodextrin 2. In the present embodiment, the carbon nanohorn is weakly oxidized, and oxygen-containing functional group(s) is introduced into the tip portion 1 of the nanohorn. On the other hand, since cyclodextrin 2 has an OH group (hydroxyl group) as shown in FIG. 1, it interacts with the oxygen-containing functional group at the tip of the nanohorn 1 and is stabilized. Here, "stabilized" means that even if the aqueous dispersion liquid containing the carbon nanohorn aggregate is stored at room temperature (for example, in the range of 20° C. to 30° C.) for one week as shown in Examples, dispersion state of the carbon nanohorn aggregate in the aqueous dispersion liquid is maintained. Herein, "interact and be stabilized" means that cyclodextrin is stabilized by hydrogen bonding between its OH group (hydroxyl group) and oxygen-containing functional group at the tip of the nanohorn. It is well known that an oxygen-containing functional group and an OH group make hydrogen bonding, and it is considered that the hydrogen bonding also stabilizes the capping of cyclodextrin, that is, prevents decap (removal of the cap) in this embodiment as well. As shown in Examples, since the hydrophilic carbon nanohorn aggregate of the present embodiment exhibits stable dispersibility over a long period of time, it is strongly presumed that the capping state is stabilized by the above-mentioned interaction, more specifically, hydrogen bonding, and it is hard to think of any other reason.

As described later, the method for producing the hydrophilic carbon nanohorn aggregate according to the present embodiment includes oxidation treatment step to oxidize the carbon nanohorn aggregate (in this step, an oxygen-containing functional group is introduced into the tip of the nanohorn) and a cyclodextrin treatment step (the tip of the nanohorn is capped with cyclodextrin and the cyclodextrin is fixed thereto). Further, step of ultrasonic treatment and/or centrifugation treatment may be included to remove impurities. Hereinafter, details will be described together with a method for producing a hydrophilic carbon nanohorn aggregate.

<Carbon Nanohorn Aggregate as Starting Material>

The carbon nanohorn aggregate as a starting material may be either a spherical carbon nanohorn aggregate or a fibrous carbon nanohorn aggregate (carbon nanobrush) (U.S. Pat. No. 6,179,678), or may be a mixture thereof.

In the spherical carbon nanohorn aggregate (hereinafter, also abbreviated as CNHs), seed-shaped, bud-shaped, dahlia-shaped, petal dahlia-shaped, or petal-shaped (graphene sheet structure) carbon nanohorn aggregates, alone or in combination, form a spherical structure (it does not necessarily mean a regular sphere, it may have other shapes such as elliptical shape and donut shape). The seed-type has such a shape that the surface of the aggregate has few or no horny protrusions; the bud-type has such a shape that the surface of the aggregate has a few horny protrusions; the dahlia-type has such a shape that the surface of the aggregate has a large number of horny protrusions; and the petal-type has such a shape that the surface of the aggregate has petal-like protrusions (graphene sheet structure). The form and particle size of the carbon nanohorn aggregate to be produced change depending on the type of the gas and its flow rate. The spherical carbon nanohorn aggregate is described in, for example, Japanese Patent Laid-Open Publication No. 2009-190928 (Patent Literature 1), and the disclosure thereof is incorporated herein in its entirety by reference.

The carbon nanohorn (single unit) is a conical-shape carbon structural body, in which a graphene sheet is rolled whose tip is hornily sharpened to a tip angle of about 20°, and the carbon nanohorn (single unit) has a diameter of 1 nm to 20 nm and a length of 30 nm to 100 nm. In the spherical carbon nanohorn aggregate, the tips are radially oriented toward the outside. The size of the spherical carbon nanohorn aggregate (CNHs) is such that the particle diameter is about 20 nm to 200 nm, preferably about 30 nm to 150 nm.

The method for producing the spherical carbon nanohorn aggregate is not particularly limited and can be produced by various means, but usually, it is produced by laser ablation method in an inert gas atmosphere using a solid carbon single material such as graphite as a target.

The fibrous carbon nanohorn aggregate is also called a carbon nanobrush (CNB), and has a structure in which a plurality of carbon nanohorns are radially aggregated and fibrously connected. From its appearance, this structure resembles a brush for test tubes or a chenille (mall) in shape. The fibrous carbon nanohorn aggregate is different from a material in which a plurality of carbon nanohorns simply range and which looks fibrous, and can retain the fibrous shape even when being subjected to an operation such as centrifugation or ultrasonic dispersion.

The fibrous carbon nanohorn aggregate is formed by connecting the above spherical carbon nanohorn aggregates with carbon nanohorns, that is, one or more of these carbon nanohorn aggregates are included in a fibrous structure. The fibrous carbon nanohorn aggregate is described in WO 2016/147909 (Patent Literature 2), and the disclosure thereof is incorporated herein in its entirety by reference.

When the fibrous carbon nanohorn aggregate is produced, a spherical carbon nanohorn aggregate is also produced at the same time. The fibrous carbon nanohorn aggregate and the spherical carbon nanohorn aggregate can be separated by the difference in size. Further, when impurities other than carbon nanohorn aggregates are contained, they can be removed by a centrifugal separation method, method based on a difference in sedimentation speed, separation by size, or the like. Further, by changing the production conditions, it is possible to change the ratio of the fibrous carbon nanohorn aggregate to the spherical carbon nanohorn aggregate.

Further, the carbon nanohorn aggregate may contain carbon nanotubes. The carbon structure of this carbon nanohorn may be a single layer or a multilayer, but a single layer is preferable.

The diameter of each carbon nanohorn (single) is 1 nm to 10 nm, and the length thereof is 30 nm to 80 nm. The fibrous carbon nanohorn aggregate has a diameter of about 30 nm to 150 nm, and a length of about 1 μm to 50 μm. The aspect ratio (length/diameter) of the fibrous carbon nanohorn aggregate is typically 6 to 1,700, and preferably 50 to 500.

The spherical carbon nanohorn aggregate has a diameter of about 30 nm to 150 nm and an almost uniform size.

The fibrous carbon nanohorn aggregate has high conductivity because it is characterized by a structure in which highly conductive carbon nanohorns are connected in a fibrous shape and has a long conductive path.

The method for producing the fibrous carbon nanohorn aggregate is not particularly limited and can be produced by various means. For example, it can be produced by a laser ablation method using a carbon containing a catalyst as a target under a nitrogen atmosphere, an inert atmosphere, or a mixed atmosphere. Fibrous carbon nanohorn aggregates and spherical carbon nanohorn aggregates are obtained during a cooling process of the evaporated carbon and the catalyst. Further, as a method for producing the fibrous carbon nanohorn aggregate, an arc discharge method or a resistance heating method can be used in addition to the laser ablation method. However, the laser ablation method is more preferable from the viewpoint that it can be produced continuously at room temperature and atmospheric pressure.

<Oxidation Treatment of Carbon Nanohorn Aggregate>

Since the tip of the carbon nanohorn aggregate contains a 5-membered ring or a 7-membered ring structure having a higher reaction activity than the 6-membered ring, the tip portion is preferentially oxidized by the oxidation treatment so that oxygen-containing functional group(s) is introduced thereto. The oxygen-containing functional group formed by the oxidation of the carbon ring includes, but is not limited to, a carbonyl group, a carboxyl group, a hydroxyl group, a nitro group, a sulfone group, a phenol group, a functional group containing an ether bond or an ester bond, and the like.

In the present invention, it is important to carry out a weak oxidation treatment, and it is preferable not to carry out excessive oxidation. The reason is as follows. Namely, oxidation starts from the highly reactive 5-membered ring or 7-membered ring that is abundant at the tip. However, excessive oxidation treatment promotes further oxidation, leading to the disappearance of the tip of the nanohorn and preventing cyclodextrin from capping, or leading to the oxidation of the body of the nanohorn to form an opening (i.e. aperture), resulting in that the bulk properties of the (hydrophilic) carbon nanohorn aggregate change, making it impossible to function as intended.

Therefore, the degree of oxidation is such that the oxydized carbon nanohorn aggregate contains oxygen atoms in an amount of preferably $1.0 \times 10^{-5}$ atomic % to 1.0 atomic % (i.e. 1.0 E-5 to 1.0 E0 atomic %), and more preferably $1.0 \times 10^{-3}$ atomic % to $1.0 \times 10^{0}$ atomic %, based on total carbon atoms (100 atomic %). The proportion of oxygen atoms to carbon atoms may be determined by various analytical method, and for example, it may be estimated from the intensity ratio of O1s and C1s in X-ray photoelectron spectroscopy.

The method of this oxidation treatment is not particularly limited, but either a gas phase process or a liquid phase process can be used. The gas phase process is carried out in a gas atmosphere such as oxygen, air, hydrogen peroxide, carbon dioxide, carbon monoxide and the like.

In the oxidation treatment, the degree of oxidation can be adjusted by at least one of temperature, time, and gas atmosphere. That is, the degree of oxidation can be adjusted by performing the oxidation treatment at different temperatures and/or at different times and/or under different atmospheres. Typically, the degree of oxidation can be increased by performing the oxidation treatment at a higher temperature and/or a longer time and/or a higher oxygen concentration.

The oxidation treatment temperature in a gas atmosphere is preferably 250 to 650° C., more preferably 300 to 500° C., and even more preferably 300° C. to 400° C. This is because if the temperature is too low, oxidation is unlikely to occur, and if the temperature is too high, the oxidation is too fast and control becomes difficult. The treatment time can be adjusted as appropriate, but it is preferably in the range of about 5 hours to 7 hours in the case that the temperature rising rate is 1° C./min.

In the case of a liquid phase process, the oxidation treatment is carried out in a liquid containing an oxidizing substance such as nitric acid, sulfuric acid and hydrogen peroxide and the like. In the case of nitric acid or sulfuric acid, the temperature range is preferably from room temperature to 120° C. In the case of hydrogen peroxide, it can be used in the temperature range of room temperature to 100° C., and 40° C. or higher is more preferable. Oxidizing power acts efficiently in the temperature range of 40 to 100° C. The treatment time can be adjusted as appropriate, but is preferably in the range of, for example, about 0.5 hour to 3 hours. In addition, it is more effective to use light irradiation together in the liquid phase process.

By the above oxidation treatment, an oxygen-containing functional group such as a carbonyl group, a carboxyl group, a hydroxyl group, a nitro group, a sulfone group, a phenol group (phenolic hydroxyl group), a functional group containing an ether bond or an ester bond, and the like can be added to the tip of the carbon nanohorn.

<Cyclodextrin Treatment>

By treating the oxidized carbon nanohorn aggregate with a cyclodextrin-containing liquid, a hydrophilic carbon nanohorn aggregate having a nanohorn tip capped with cyclodextrin can be produced. Since an oxygen-containing functional group is introduced at the tip of the carbon nanohorn aggregate, it interacts, more specifically forms hydrogen bonding, with the OH group of cyclodextrin to fix and stabilize cyclodextrin.

Cyclodextrin (hereinafter sometimes abbreviated as "CD") is a cyclic oligosaccharide, a non-reducing sugar in which glucose residues are linked by α-1,4 bonding to form a ring, and has a torus structure, also called as a bottomless bucket-structure or a crown-structure. The inside of cyclodextrin is hydrophobic, but cyclodextrin is water-soluble because it has a large number of OH groups on the outside.

Examples of cyclodextrins include well-known cyclodextrins such as, depending on the number of constituent glucoses, unsubstituted cyclodextrins containing 6 to 12 glucose units, especially α-cyclodextrins, β-cyclodextrins, and γ-cyclodextrins and/or derivatives thereof, and/or mixtures thereof. α-Cyclodextrin consists of 6 glucose units, β-cyclodextrin consists of 7 glucose units, and γ-cyclodextrin consists of 8 glucose units, each of which has a different cavity size. In the present embodiment, it is preferable to contain at least one selected from the group consisting of α-cyclodextrin, β-cyclodextrin and γ-cyclodextrin.

The cyclodextrin treatment includes bringing the oxidized carbon nanohorn aggregate into contact with cyclodextrin in a solution containing cyclodextrin dissolved therein. The dispersion medium that can be used includes water or a dispersion medium containing, if necessary, a surfactant, a water-soluble organic solvent, or the like in addition to water.

The amount of cyclodextrin added can be appropriately selected, but is, for example, 0.1 to 50 parts by mass, preferably 0.5 to 10 parts by mass with respect to 100 parts by mass of the oxidized carbon nanohorn aggregate.

The treatment conditions are not particularly limited, and can be appropriately selected, for example, in the range of 0 to 100° C., preferably in the range of 10° C. to 70° C. In one embodiment, for example, the range of 15° C. to 60° C., which is close to room temperature, is preferable. The processing time may be appropriately set, but for example, it is 10 minutes or more, preferably 3 hours or more, and there is no particular upper limit, but it may be carried out in the range of, for example, 10 days or less.

By the method described above, a hydrophilic carbon nanohorn aggregate is obtained in which the oxygen-containing functional group at the tip of the carbon nanohorn aggregate and the hydroxyl group of cyclodextrin interact, more specifically form hydrogen bonding, to fix and stabilize cyclodextrin. By obtaining hydrophilicity, dispersibility in an aqueous medium is improved.

<Ultrasonic Treatment and/or Centrifugal Treatment Step>

In order to better disperse the hydrophilic carbon nanohorn aggregate thus obtained, it is preferable to perform ultrasonic treatment in the liquid as it is after the cyclodextrin treatment, or in a different liquid after recovering the hydrophilic carbon nanohorn aggregate, preferably in an aqueous solution. At this time, examples of a treatment apparatus that can be used include a bath-type treatment apparatus that applies ultrasonic waves from the outside of a container filled with the liquid, and a chip-type treatment apparatus that inserts a chip-type oscillator into a container, but a bath type is preferable because it is simple and less likely to be contaminated with impurities. The frequency and processing time can be set as appropriate, but the frequency is preferably 28 KHz to 100 KHz, and the processing time is preferably 5 minutes to 30 minutes.

Further, if necessary, a subsequent centrifugation treatment may be performed to remove impurities such as graphite in the carbon nanohorn aggregate.

Since the hydrophilic carbon nanohorn aggregate thus obtained has a low content of impurities and no pores are formed on the body surface, it is also suitable for a catalyst carrier or for functionalization of the hydrophilic carbon nanohorn aggregate by introducing a chemically modified group.

The hydrophilic carbon nanohorn aggregate obtained in this embodiment has extremely excellent dispersibility in water. In the case of spherical carbon nanohorn aggregates, in the particle size distribution obtained by the dynamic light scattering measuring, 90% by mass or more, preferably 95% by mass or more, more preferably 98% by mass or more of the hydrophilic carbon nanohorn aggregates in a dispersion liquid using water as a dispersion medium, have a particle size of 400 nm or less.

The hydrophilic carbon nanohorn aggregate according to the present invention can be used for various purposes. Since the carbon nanohorn aggregate is excellent in conductivity, catalytic activity, adsorption/absorption, and thermal conductivity, it can be applied to a wide range of applications such as electrode materials for lithium ion batteries, fuel cells, capacitors, electrochemical actuators, air batteries and solar cells; electromagnetic wave shielding materials, heat conductive sheets, heat dissipation sheets, protective sheets, filters, absorbent materials and the like.

EXAMPLES

The present invention will be described in more details using Examples shown below, but the present invention is not limited to the following examples.

Example 1

(Step 1: Production of CNHs)

Carbon nanohorn aggregates (CNHs) were produced by the $CO_2$ laser ablation method. First, a sintered round bar carbon as a solid carbon material was placed in a vacuum vessel, and the solid carbon material was irradiated with $CO_2$ laser light under the conditions of a laser power density of 30 kW/cm$^2$ and a target rotation speed of 2 rpm in an Ar atmosphere for 30 minutes at room temperature. The soot-like substance thus obtained was observed with a transmission electron microscope (TEM), and it was confirmed that the soot-like substance had a carbon nanohorn aggregate structure.

(Step 2: Production of oxCNHs)

The carbon nanohorn aggregates (oxCNHs), in which the tip of the nanohorn was oxidized and an oxygen-containing group was introduced, were produced by heating the CNHs produced in step 1 in and a tabletop muffle furnace (KDFS70) in an air atmosphere in the range of 300° C. to 400° C. for 4 to 7 hours.

(Step 3: Production of CD-oxCNHs)

Hydrophilic carbon nanohorn aggregates (CD-oxCNHs) capped with cyclodextrin were produced as follows. First, 20 mg of oxCNHs produced in step 2 was placed into 80 mL of water, and ultrasonic dispersion treatment was performed for 15 minutes to prepare an oxCNHs dispersion liquid. Next, 5 mg of γ-CD was added, and the mixture was stirred at 40° C. for 12 hours. Then, ultrasonic treatment was performed for 15 minutes, and centrifugation was performed at 3000 rpm for 20 minutes. Subsequently, filter-washing was performed using a filter having a pore size of 200 nm, and excess γ-CD was washed and removed to produce CD-oxCNHs.

<Comparative Example 1> (Production of CD-CNHs)

Carbon nanohorn aggregates (CD-CNHs) capped with cyclodextrin without oxidation treatment of carbon nanohorn aggregates were produced as follows. First, 20 mg of CNHs prepared in step 1 of Example 1 was placed into 80 mL of water, and ultrasonic dispersion treatment was performed for 15 minutes. Next, 5 mg of γ-CD was added to the CNHs dispersion liquid and stirred at 40° C. for 12 hours. Then, ultrasonic treatment was performed for 15 minutes, and then centrifugation was performed at 3000 rpm for 20 minutes. Subsequently, filter-washing was performed using a filter having a pore size of 200 nm, and excess γ-CD was washed and removed to produce CD-CNHs of Comparative Example.

Figure 2A:
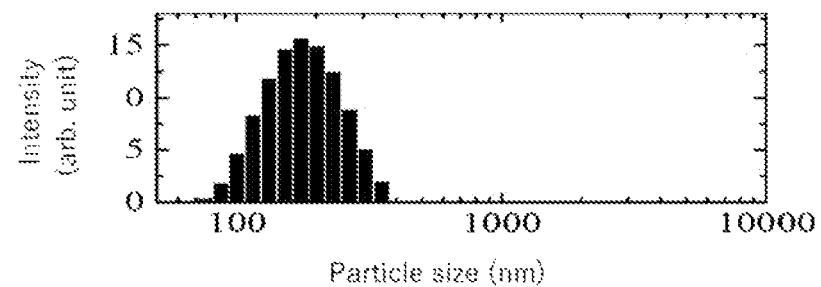
FIG. 2A is a graph showing the particle size distribution of the CD-oxCNHs dispersion liquid produced in Example.
Figure 2B:
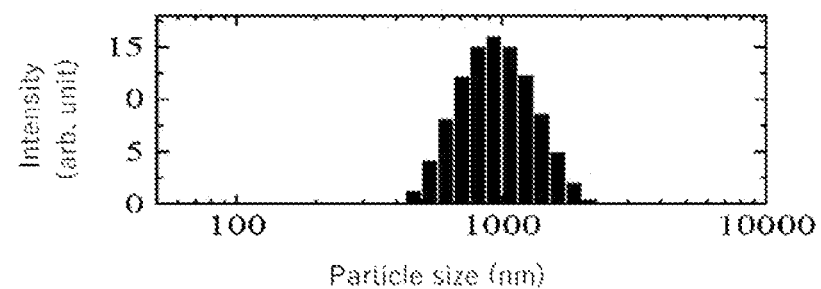
FIG. 2B is a graph showing the particle size distribution of the CD-CNHs dispersion liquid produced in Comparative Example.
Figure 2C:
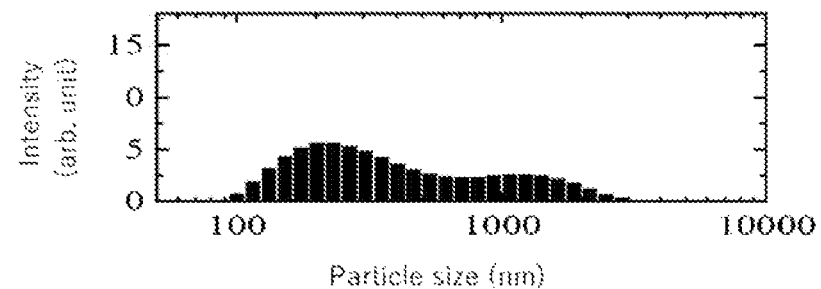
FIG. 2C is a graph showing the particle size distribution of the oxCNHs dispersion liquid produced in the intermediate process of an Example.

The particle size distributions obtained by a dynamic light scattering method are shown in FIGS. 2A to 2C for CD-oxCNHs produced in Example 1 (FIG. 2A), CD-CNHs produced in Comparative Example 1 (FIG. 2B) and oxCNHs produced in step 2 of Example 1 (FIG. 2C).

From FIG. 2A, it can be seen that the nanohorn particles are dispersed as primary particles in the CD-oxCNHs, but from FIG. 2B, the nanohorn particles are aggregated in the CD-CNHs. Further, from FIG. 2C, it can be seen that dispersed nanohorn particles and agglomerated nanohorn particles are present in a wide range in the oxCNHs obtained by oxidation treatment.

Figure 3:
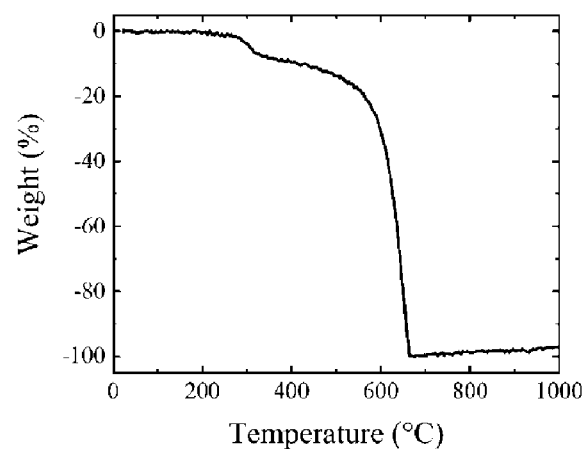
FIG. 3 is a graph showing the TGA results of CD-oxCNHs.

FIG. 3 is a graph showing the TGA results of CD-oxCNHs. From FIG. 3, it can be seen that after centrifugation and after filter-washing, since impurities has been removed, only the weight loss of CD and CNHs is observed.

Figure 4A:
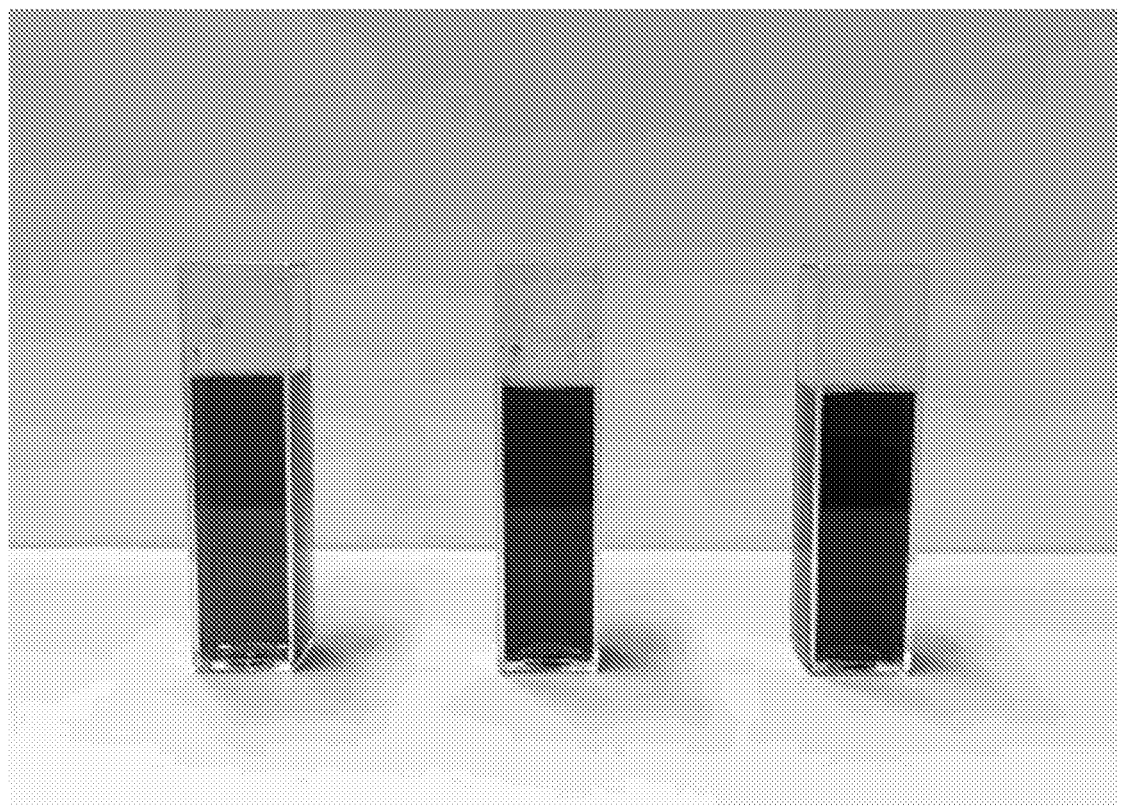
FIG. 4A is a photograph showing the dispersed state after 10 minutes of oxCNHs dispersion liquid (left), CD-CNHs dispersion liquid (center), and CD-oxCNHs dispersion liquid (right).
Figure 4B:
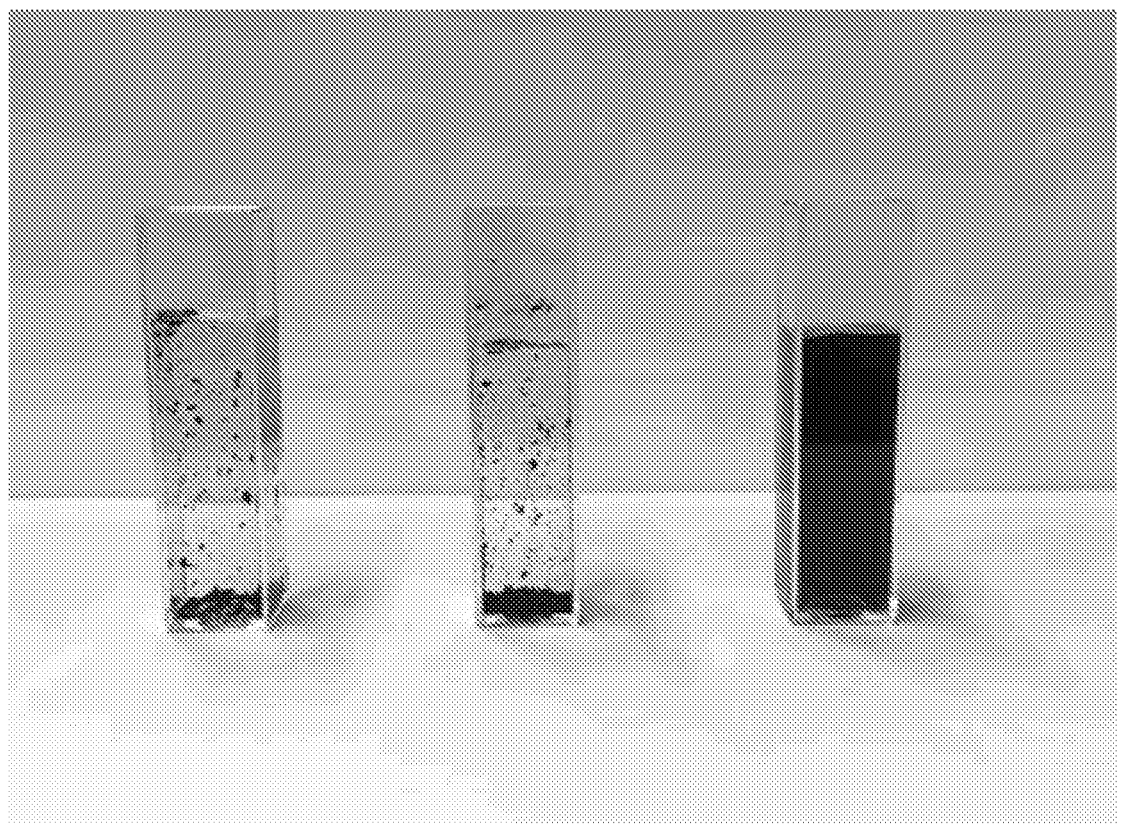
FIG. 4B is a photograph showing the dispersed state after 10 hours of oxCNHs dispersion liquid (left), CD-CNHs dispersion liquid (center), and CD-oxCNHs dispersion liquid (right).

1 mg each of oxCNHs, CD-CNHs, and CD-oxCNHs was dispersed in 10 mL of water. FIG. 4A is a photograph showing the dispersed state after 10 minutes of oxCNHs dispersion liquid (left), CD-CNHs dispersion liquid (center), and CD-oxCNHs dispersion liquid (right), and FIG. 4B shows a photograph after 10 hours of the same dispersion liquids. After 10 hours as shown in FIG. 4B, aggregation and precipitation are observed except for the cases of CD-oxCNHs. In addition, it was revealed that CD-oxCNHs did not change even after one week, and therefore it remains stably in a highly dispersed state.

Although the present invention has been described above with reference to the embodiments and examples, the present invention is not limited to the above embodiments and examples. Various changes that can be understood by those skilled in the art can be made within the scope of the present invention in terms of the configuration and details of the present invention.

Some or all of the above embodiments may also be described as in the appendix below, but the disclosures of the present application are not limited to the appendix below.

[Supplementary Note 1]

A hydrophilic carbon nanohorn aggregate comprising:

a carbon nanohorn aggregate having an oxygen-containing functional group introduced at a tip of a carbon nanohorn, and a cyclodextrin which is capping the tip of the carbon nanohorn and being stabilized.

[Supplementary Note 2]

The hydrophilic carbon nanohorn aggregate according to Supplementary note 1, wherein the cyclodextrin comprises at least one selected from the group consisting of α-cyclodextrin, β-cyclodextrin, γ-cyclodextrin, and derivatives thereof.

[Supplementary Note 3]

The hydrophilic carbon nanohorn aggregate according to Supplementary note 1 or 2, wherein the oxygen-containing functional group is introduced by oxidizing the tip of the carbon nanohorn.

[Supplementary Note 4]

A hydrophilic carbon nanohorn aggregate dispersion liquid comprising the hydrophilic carbon nanohorn aggregate according to any one of Supplementary notes 1 to 3 and water.

[Supplementary Note 5]

The hydrophilic carbon nanohorn aggregate dispersion liquid according to Supplementary note 4, wherein 90% by mass or more of the hydrophilic carbon nanohorn aggregate has a particle diameter of 400 nm or less in a particle size distribution obtained by dynamic light scattering method.

[Supplementary Note 6]

A method for producing a hydrophilic carbon nanohorn aggregate comprising:

oxidation treatment step to oxidize a carbon nanohorn aggregate, and cyclodextrin treatment step to contact cyclodextrin with the oxidized carbon nanohorn aggregate.

[Supplementary Note 7]

The method for producing a hydrophilic carbon nanohorn aggregate according to Supplementary note 6, wherein the oxidation treatment step is a step of introducing an oxygen-containing functional group into a tip of a carbon nanohorn.

[Supplementary Note 8]

The method for producing a hydrophilic carbon nanohorn aggregate according to Supplementary note 7, wherein the cyclodextrin treatment step is a step of capping the tip of the carbon nanohorn with the cyclodextrin and fixing the cyclodextrin.

[Supplementary Note 8a]

The method for producing a hydrophilic carbon nanohorn aggregate according to any one of Supplementary notes 6 to 8, further comprising performing ultrasonic treatment and/or centrifugation treatment.

[Supplementary Note 9]

The method for producing a hydrophilic carbon nanohorn aggregate according to any one of Supplementary notes 6 to 8, wherein in the oxidation treatment step, a degree of oxidation is adjusted by at least one of temperature, time, and gas atmosphere.

[Supplementary Note 9a]

The method for producing a hydrophilic carbon nanohorn aggregate according to Supplementary note 9, wherein the gas atmosphere comprises at least one selected from the group consisting of oxygen, air, hydrogen peroxide, carbon dioxide and carbon monoxide.

[Supplementary Note 10]

The method for producing a hydrophilic carbon nanohorn aggregate according to any one of Supplementary notes 6 to 9, the oxidation treatment step is performed so that a degree of oxidation becomes such that the oxydized carbon nanohorn aggregate contains oxygen atoms in an amount of $1.0 \times 10^{-5}$ to 1.0 atomic %, based on total carbon atoms.

EXPLANATION OF REFERENCE

1 tip portion of carbon nanohorn
2 cyclodextrin

The invention claimed is:

1. A hydrophilic carbon nanohorn aggregate comprising:
    a carbon nanohorn aggregate having an oxygen-containing functional group introduced at a tip of a carbon nanohorn, and
    a cyclodextrin that is capping the tip of the carbon nanohorn and being stabilized,
    wherein the capping of the cyclodextrin is stabilized by an interaction with the oxygen-containing functional group.

2. The hydrophilic carbon nanohorn aggregate according to claim 1, wherein the cyclodextrin comprises at least one selected from the group consisting of α-cyclodextrin, β-cyclodextrin, γ-cyclodextrin, and derivatives thereof.

3. The hydrophilic carbon nanohorn aggregate according to claim 1, wherein the oxygen-containing functional group is introduced by oxidizing the tip of the carbon nanohorn.

4. The hydrophilic carbon nanohorn aggregate according to claim 3, wherein the oxygen-containing functional group is introduced by oxidizing the tip of the carbon nanohorn at 300° C. to 400° C.

5. A hydrophilic carbon nanohorn aggregate dispersion liquid comprising, the hydrophilic carbon nanohorn aggregate according to claim 1 and water.

6. The hydrophilic carbon nanohorn aggregate dispersion liquid according to claim 5, wherein 90% by mass or more of the hydrophilic carbon nanohorn aggregate has a particle diameter of 400 nm or less in a particle size distribution obtained by dynamic light scattering method.

7. The hydrophilic carbon nanohorn aggregate according to claim 1, wherein the interaction is achieved by hydrogen bonding.

8. The hydrophilic carbon nanohorn aggregate according to claim 1, wherein the oxygen-containing functional group is introduced by oxidizing the tip of the carbon nanohorn at 300° C. to 400° C.

9. A method for producing a hydrophilic carbon nanohorn aggregate comprising:
   oxidation treatment step to oxidize a carbon nanohorn aggregate, and
   cyclodextrin treatment step to contact cyclodextrin with the oxidized carbon nanohorn aggregate.

10. The method for producing a hydrophilic carbon nanohorn aggregate according to claim 9, wherein the oxidation treatment step is a step of introducing an oxygen-containing functional group into a tip of a carbon nanohorn.

11. The method for producing a hydrophilic carbon nanohorn aggregate according to claim 10, wherein the cyclodextrin treatment step is a step of capping the tip of the carbon nanohorn with the cyclodextrin and fixing the cyclodextrin.

12. The method for producing a hydrophilic carbon nanohorn aggregate according to claim 9, wherein in the oxidation treatment step, a degree of oxidation is adjusted by at least one of temperature, time, and gas atmosphere.

13. The method for producing a hydrophilic carbon nanohorn aggregate according to claim 9, the oxidation treatment step is performed so that a degree of oxidation becomes such that the oxidized carbon nanohorn aggregate contains oxygen atoms in an amount of $1.0 \times 10^{-5}$ to 1.0 atomic %, based on total carbon atoms.

\* \* \* \* \*